US009218483B2

(12) United States Patent
Matthews et al.

(10) Patent No.: US 9,218,483 B2
(45) Date of Patent: Dec. 22, 2015

(54) SYNTHETIC PROCESSING DIVERSITY WITH MULTIPLE ARCHITECTURES WITHIN A HOMOGENEOUS PROCESSING ENVIRONMENT

(71) Applicant: Raytheon BBN Technologies, Corp., Cambridge, MA (US)

(72) Inventors: David Matthews, Ellicott City, MD (US); Robert Martz, Laurel, MD (US)

(73) Assignee: RAYTHEON CYBER PRODUCTS, LLC, Herndon, VA (US)

( * ) Notice: Subject to any disclaimer, the term of this patent is extended or adjusted under 35 U.S.C. 154(b) by 2 days.

(21) Appl. No.: 13/939,061

(22) Filed: Jul. 10, 2013

(65) Prior Publication Data

US 2015/0020206 A1  Jan. 15, 2015

(51) Int. Cl.
*G06F 21/62* (2013.01)
*G06F 21/52* (2013.01)

(52) U.S. Cl.
CPC ..................................... *G06F 21/52* (2013.01)

(58) Field of Classification Search
USPC ............ 726/17, 2, 21, 26; 713/150, 163, 181; 380/255, 264, 276
See application file for complete search history.

(56) References Cited

U.S. PATENT DOCUMENTS

| | | | |
|---|---|---|---|
| 8,510,596 B1 * | 8/2013 | Gupta et al. ..................... 714/15 |
| 2002/0016918 A1 | 2/2002 | Tucker et al. | |
| 2005/0183072 A1 | 8/2005 | Horning et al. | |
| 2007/0039048 A1 | 2/2007 | Shelest et al. | |
| 2010/0082945 A1 * | 4/2010 | Adachi et al. ................. 712/200 |
| 2011/0238855 A1 * | 9/2011 | Korsunsky et al. ........... 709/231 |
| 2012/0173497 A1 * | 7/2012 | Devalla et al. ................ 707/698 |
| 2012/0204039 A1 | 8/2012 | Farrugia et al. | |
| 2012/0260106 A1 | 10/2012 | Zaks et al. | |

FOREIGN PATENT DOCUMENTS

WO    WO 00/39956    6/2000

OTHER PUBLICATIONS

Barrantes, Elena Gabriela, et al. "Randomized instruction set emulation." *ACM Transactions on Information and System Security (TISSEC)* 8.1 (2005): 3-40.
Kc, Gaurav S., et al. "Countering code-injection attacks with instruction-set randomization." *Proceedings of the 10th ACM conference on Computer and communications security*. ACM, 2003. pp. 272-280.
Forrest, "Building Diverse Computer Systems", Operating Systems, 1997, The Sixth Workshop on Hot Topics in Cape Cod, MA, USA, May 5-6, 1997, Los Alamitos, CA, USA, IEEE Comput. Soc. US, May 5, 1997 (pp. 67-72).

(Continued)

*Primary Examiner* — Jason K. Gee
*Assistant Examiner* — Sharif E Ullah
(74) *Attorney, Agent, or Firm* — Christie, Parker & Hale, LLP

(57) ABSTRACT

A method of increasing processing diversity on a computer system includes: loading a plurality of instruction streams, each of the plurality of instruction streams being equivalent; executing, in a context, a first stream of the plurality of instruction streams; stopping execution of the first stream at a first location of the first stream; and executing, in the context, a second stream of the plurality of instruction streams at a second location of the second stream, the second location corresponding to the first location of the first stream.

14 Claims, 13 Drawing Sheets

(56) References Cited

OTHER PUBLICATIONS

Written Opinion of the International Searching Authority for International Application No. PCT/US2014/031687, filed Mar. 25, 2014, Written Opinion of the International Searching Authority mailed Jul. 10, 2014 (6 pgs.).

International Search Report for International Application No. PCT/US2014/031687, filed Mar. 25, 2014, International Search Report dated Jul. 1, 2014 and mailed Jul. 10, 2014 (4 pgs.).

Chew, Monica, et al.; "Mitigating buffer overflows by operating system randomization"; Technical Report CMU-CS-02-197; Carnegie Mellon University; Dec. 2002; 11 pages.

Cowan, Crispin, et al; "StackGuard: Automatic Adaptive Detection and Prevention of Buffer-Overflow Attacks"; *Proceedings of the 7th USENIX Security Symposium*; (Jan. 26-29, 1998); 15 pages.

Haugh, Eric, et al.; "Testing C Programs for Buffer Overflow Vulnerabilities"; *In Proceedings of the Network and Distributed System Security Symposium*; 2003; 8 pages.

Shacham, Hovav, et al.; "On the effectiveness of address-space randomization"; *Proceedings of the 11th ACM conference on Computer and communications security*; ACM; 2004; 10 pages.

Whitehouse, Ollie; "An analysis of address space layout randomization on Windows Vista"; *Symantec advanced threat research*; (2007); pp. 1-14.

\* cited by examiner

--Prior Art--

SYNTHETIC PROCESSING DIVERSITY WITH MULTIPLE ARCHITECTURES WITHIN A HOMOGENEOUS PROCESSING ENVIRONMENT

STATEMENT REGARDING FEDERALLY SPONSORED RESEARCH OR DEVELOPMENT

This invention disclosure is related to Government Contract No. FA8750-12-C-0098. The Government has certain rights in this invention.

BACKGROUND

Aspects of embodiments of the present invention relate to the field of computer security, and, more specifically, protection against code injection attacks.

FIG. 1 is a schematic diagram of a typical computer system. In a typical computer system, a central processing unit (CPU) 10 includes a program counter (PC) 12, a plurality of registers 14, an arithmetic/logic unit (ALU) 16, and a bus interface 18. The program counter 12 provides the address of the next instruction to be executed, the registers 14 store data and values currently being computed, and the ALU 16 performs computations on the data stored in the registers 14. Data is transferred into and out of the CPU 10 via the bus interface 18, which interfaces with an I/O bridge 20 to communicate with main memory 30 and other peripheral devices 40. While FIG. 1 illustrates one typical computer system, various other typical computer systems may be organized in different ways (for example, the I/O bridge 20 may be integrated into the CPU 10, or the CPU 10 may include memory caches).

FIG. 2 is a schematic diagram illustrating a stack smashing buffer overflow attack. C. Cowan, et al., *StackGuard: Automatic Adaptive Detection and Prevention of Buffer-Overflow Attacks* 7 PROC. OF USENIX SEC. SYMP. (1998). As seen in FIG. 2, the stack 100 is stored in main memory 30 and grows in a downward direction (e.g., away from 0xFFFF and toward 0x0000). When a function call is made, a "Return Address" is pushed onto the stack and space is allocated for local variables, including a potentially attackable buffer at lower addresses. When input data is stored the buffer, the data (e.g., a text string from user input) grows in an upward direction (with increasing addresses). If the size of the input data exceeds the allocated size of the buffer, data located at higher addresses than the buffer can be overwritten with the supplied data. In FIG. 2, for example, the data overflowing the buffer could overwrite the Local Variables, the return address, and portions of the stack above the return address (which is generally the portion of the stack allocated to the calling function).

As seen in FIG. 2, the overflowing buffer can be used to insert executable attack code into the stack and to overwrite the return address with a pointer to the attack code. As such, when the attacked function exits, the processor jumps to and executes the attack code instead of the function that it was called from. The attack code can be used to gain root (or administrator) access to the machine by, for example, executing the command 'exec("sh")' to produce a root shell.

Generally, stack-based code injection attacks require: knowledge of the instruction set of the underlying architecture; knowledge of the location of one or more buffers on the stack; ability to inject code/data; and ability to redirect the control flow. An attacker can use the stack to return to the injected or other arbitrary code.

In a homogeneous system (or homogenous portion of a heterogeneous system) it is easy for an attacker to craft a suitable machine code attack payload because the underlying instruction set architecture is known. Increasing the hardware diversity of a system can mitigate or overcome this problem, but this is not always a feasible option due to cost (e.g., the cost of duplicating hardware) or environmental constraints of the system in question. For example, weight or space constraints on an aircraft can limit the ability to add additional processing elements.

One existing technology to obfuscate the underlying instruction set is the use of Instruction Set Randomization (ISR). ISR randomizes the instructions in memory and then decodes the instructions before execution. This is effective in temporarily obscuring the underlying architecture, but, if the randomization value is discovered, a new attack can be crafted and injected. See, for example, Gaurav S. Kc, Angelos D. Keromytis, and Vassilis Prevelakis. *Countering Code-Injection Attacks With Instruction-Set Randomization.* 10 ACM CONF. ON COMP. AND COMM. SEC. PROC. 272 (2003) and see Elena Gabriela Barrantes, et al. *Randomized Instruction Set Emulation.* 8.1 ACM TRANSACTIONS ON INFO. AND SYS. SEC. (TISSEC) 3 (2005).

SUMMARY

According to one embodiment of the present invention, a method of increasing processing diversity on a computer system includes: loading a plurality of instruction streams, each of the plurality of instruction streams being equivalent and being encoded in a different instruction set of a plurality of instruction sets; executing, in a context, a first stream of the plurality of instruction streams; stopping execution of the first stream at a first location of the first stream; and executing, in the context, a second stream of the plurality of instruction streams at a second location of the second stream, the second location corresponding to the first location of the first stream.

The plurality of instruction streams may be loaded from a binary.

The plurality of instruction streams may be generated from an instruction stream loaded from a binary.

The method of increasing processing diversity on the computer system may be performed using a virtualization program executing on the computer system.

The method of increasing processing diversity on the computer system may be performed using a hardware instruction selector.

The loading the plurality of instruction streams may include: loading computer code; encoding the computer code, using a plurality of encoding keys, to generate the plurality of instruction streams, each instruction stream being encoded by a corresponding one of the encoding keys; and storing the encoded instruction streams in memory.

The executing, in the context, the first stream of the plurality of instruction streams may include: decoding a first instruction in a first encoded instruction steam of the encoded instruction streams using a corresponding first encoding key of the encoding keys; and executing the first instruction, and the executing, in the context, the second stream of the plurality of instruction streams may include: decoding a second instruction in a second encoded instruction steam of the encoded instruction streams using a corresponding second encoding key of the encoding keys; and executing the second instruction.

According to one embodiment of the present invention, a non-transitory computer readable medium embodies program instructions for execution by a data processing apparatus, the program instructions adapting the processing apparatus for: loading a plurality of instruction streams, each of the plurality of instruction streams being equivalent and being encoded in a different instruction set of a plurality of instruction sets; executing, in a context, a first stream of the plurality of instruction streams; stopping execution of the first stream at a first location of the first stream; and executing, in the context, a second stream of the plurality of instruction streams at a second location of the second stream, the second location corresponding to the first location of the first stream.

The plurality of instruction streams may be loaded from a binary.

The plurality of instruction streams may be generated from an instruction stream loaded from a binary.

The non-transitory computer readable medium may further embody a virtualization program, and the virtualization program may include the program instructions.

The loading the plurality of instruction streams may include: loading computer code; encoding the computer code, using a plurality of encoding keys, to generate the plurality of instruction streams; and storing the encoded instruction streams in memory.

The executing, in the context, the first stream of the plurality of instruction streams may include: decoding a first instruction in a first encoded instruction steam of the encoded instruction streams using a corresponding first encoding key of the encoding keys; and executing the first instruction, and the executing, in the context, the second stream of the plurality of instruction streams may include: decoding a second instruction in a second encoded instruction steam of the encoded instruction streams using a corresponding second encoding key of the encoding keys; and executing the second instruction.

According to one embodiment of the present invention, a computer system includes a processor and memory storing program instructions, the computer system being configured to: load a plurality of instruction streams into the memory, each of the plurality of instruction streams being equivalent and being encoded in a different instruction set of a plurality of instruction sets; execute, in a context, a first stream of the plurality of instruction streams; stop execution of the first stream at a first location of the first stream; and execute, in the context, a second stream of the plurality of instruction streams at a second location of the second stream, the second location corresponding to the first location of the first stream.

The plurality of instruction streams may be loaded from a binary.

The plurality of instruction streams may be generated from an instruction stream loaded from a binary.

A virtualization program executing on the computer system may configure the computer system to: execute, in the context, the first stream of the plurality of instruction streams; stop execution of the first stream at the first location of the first stream; and execute, in the context, the second stream of the plurality of instruction streams.

The system may further comprise a hardware instruction selector configured to execute, in the context, the first stream of the plurality of instruction streams; stop execution of the first stream at the first location of the first stream; and execute, in the context, the second stream of the plurality of instruction streams.

The system may be configured to load the plurality of instruction streams by: loading computer code; encoding the computer code, using a plurality of encoding keys, to generate the plurality of instruction streams, each of the instruction streams being encoded by a corresponding one of the encoding keys; and storing the encoded instruction streams in memory.

The computer system may be configured to execute, in the context, the first stream of the plurality of instruction streams by: decoding a first instruction in a first encoded instruction steam of the encoded instruction streams using a corresponding first encoding key of the encoding keys; and executing the first instruction, and the computer system may be configured to execute, in the context, the second stream of the plurality of instruction streams by: decoding a second instruction in a second encoded instruction steam of the encoded instruction streams using a corresponding second encoding key of the encoding keys; and executing the second instruction.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
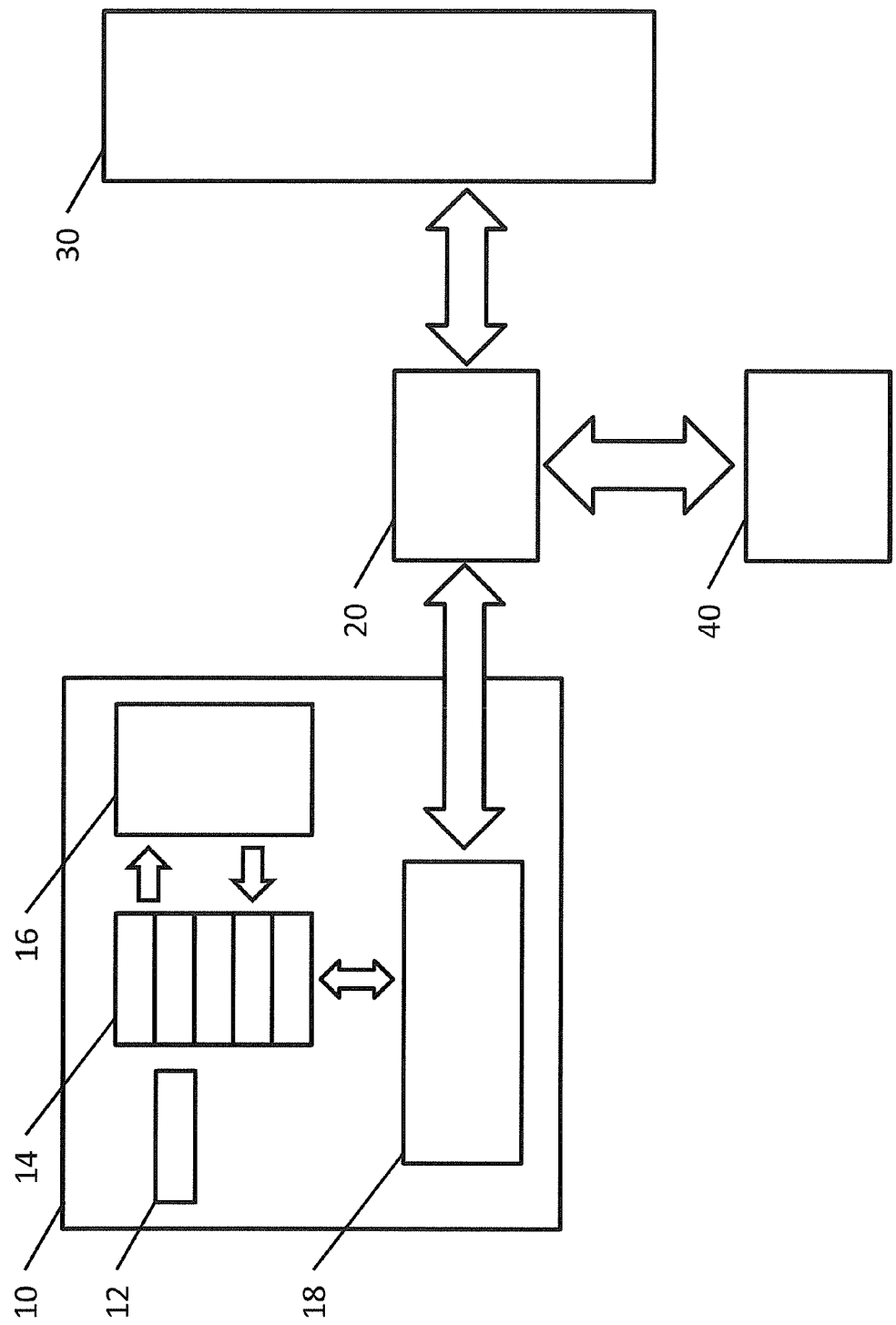
FIG. 1 is a schematic diagram of a typical computer system.
Figure 2:
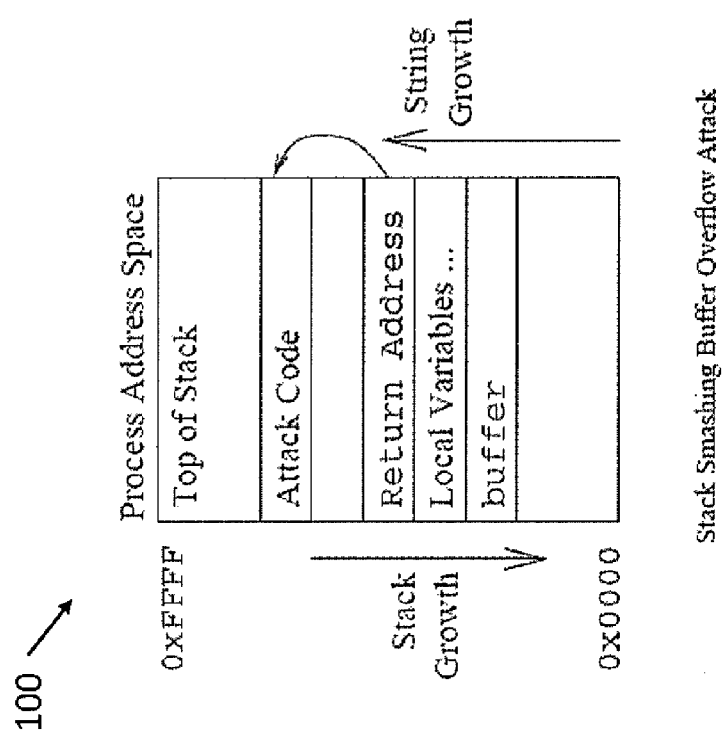
FIG. 2 is a schematic diagram illustrating a stack smashing buffer overflow attack.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Embodiments of the present invention are directed to methods, systems, and computer programs for improving the security of a computer system against machine code injection attacks through the use of instruction stream (or "architecture") selection. The instruction stream selection can provide a large number of combinations of instruction sets that continually change throughout execution of a program.

Aspects of embodiments of the present invention are directed to a method of creating synthetic diversity in an otherwise homogeneous system by providing to a processor an instruction stream randomly selected from a plurality of equivalent instruction streams. A new instruction stream from the plurality of equivalent instruction streams can be selected and switched (or shifted) to at any interval, down to the instruction-by-instruction level (e.g., switching between instruction streams after each instruction in executed).

Incorporating many architectures (or "instruction streams") during execution can mitigate attacks by making it more difficult for an attacker to craft an appropriate attack payload. Architectural shifting can be seen as a computer architecture analogue to frequency hopping in radio systems in which every instruction in a program can be executed on one of many architectures. Many, shifting architectures force an attacker to craft a multi-architecture payload and force the attacker to guess the proper sequence of architectures being employed and the timing of those architecture shifts, thereby increasing the effort needed for a successful attack. The probability of successfully crafting a payload that operates in a shifting environment quickly approaches zero for even a small number of architectures and a small payload size.

Figure 3:
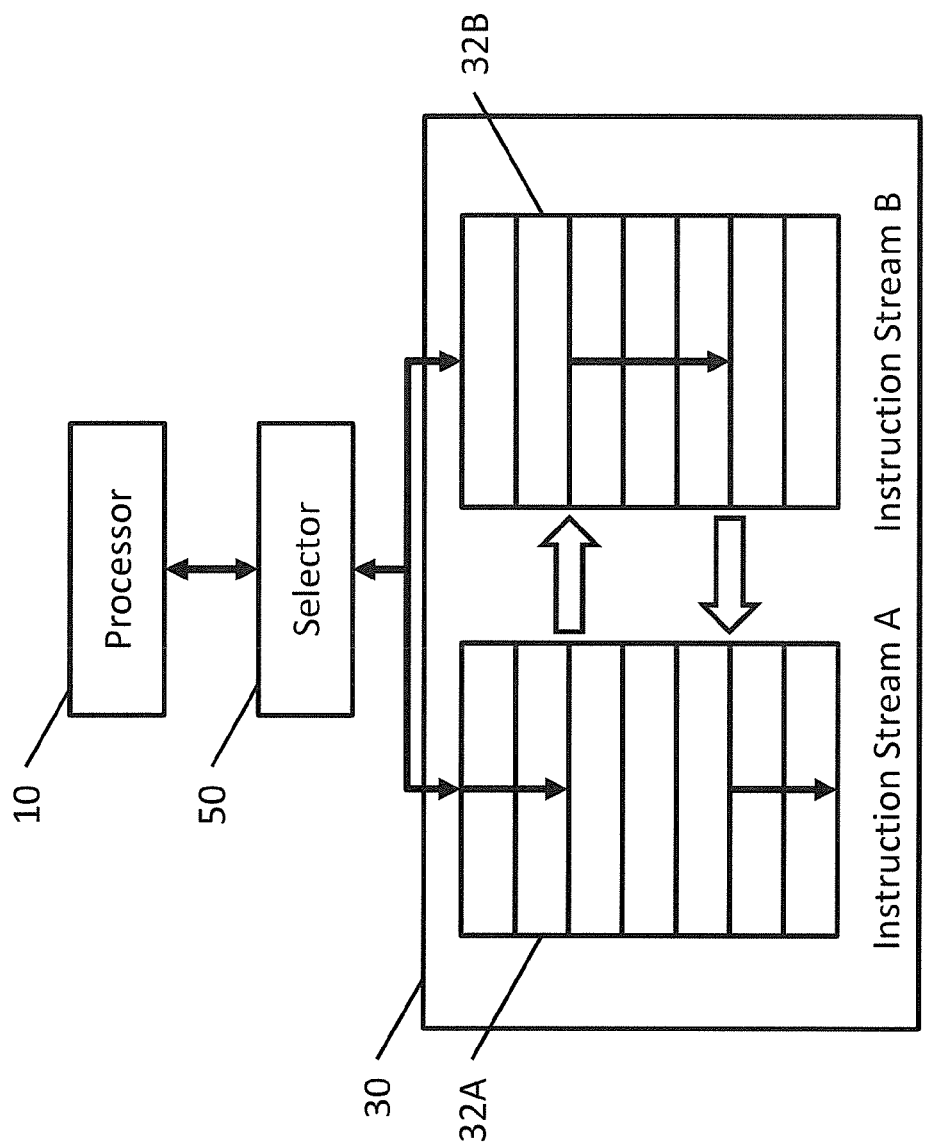
FIG. 3 is a schematic diagram illustrating a system configured to switch between instruction streams according to one embodiment of the present invention.

FIG. 3 is a schematic diagram illustrating a system configured to switch between instruction streams according to one embodiment of the present invention. Referring to FIG. 3, a processor 10 is coupled to an instruction stream selector 50, which selects between instructions in Instruction Stream A 32A and Instruction Stream B 32B, which are stored in main memory 30. These equivalent instruction streams share the same context (e.g., registers, stack, and heap). In other words, the context is controlled by the instruction stream selector 50, which gives control of the context to the selected instruction stream.

Injecting multiple equivalent instructions streams and alternating between the instruction streams (possibly at random) provides increased architectural diversity on a single processor system because the attacker cannot predict or depend upon any assumptions about which instruction stream will be running at a given time. Although code injection is not prevented (e.g., because buffer-overflow attacks can still introduce attack code into the system), the ability of an attacker to successfully gain control of the system using code injection is limited.

Referring to FIG. 3, in one embodiment of the present invention, the instruction selector 50 is located between a processor and its instruction stream(s). Functionally, the instruction selector 50 selects from a set of instruction streams (e.g., instruction stream A 32A and instruction stream B 32B). The selection mechanism is random and can occur at any desired interval (e.g., after each instruction, after each block of instructions, after a time interval, or after a number of clock cycles). In various embodiments of the present invention, the instruction streams may be formatted or include instructions from any instruction set, as long as the formatting and the instructions are valid and can be interpreted by the processor.

In one embodiment, each of the instruction streams is identical (e.g., each stream has, bit-for-bit, the same instructions) and uses the same instruction set. Identical streams can add a level of protection because an attacker must attack multiple streams in order for the attack to succeed, which likens such embodiments to a multiple processor system.

Figure 4A:
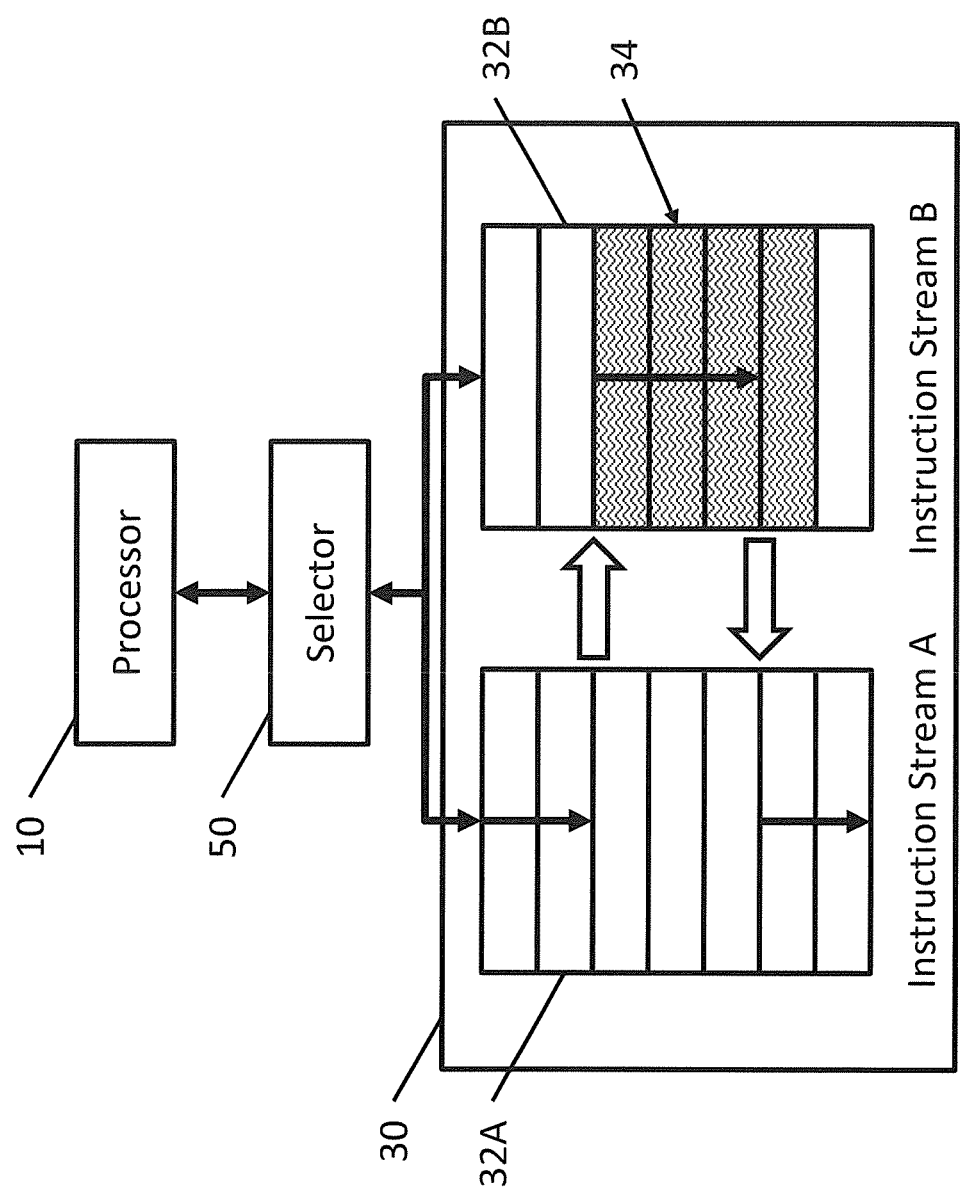
FIGS. 4A and 4B are schematic diagrams illustrating switching between instruction streams according to one embodiment of the present invention in the context of a code injection attack.
Figure 4B:
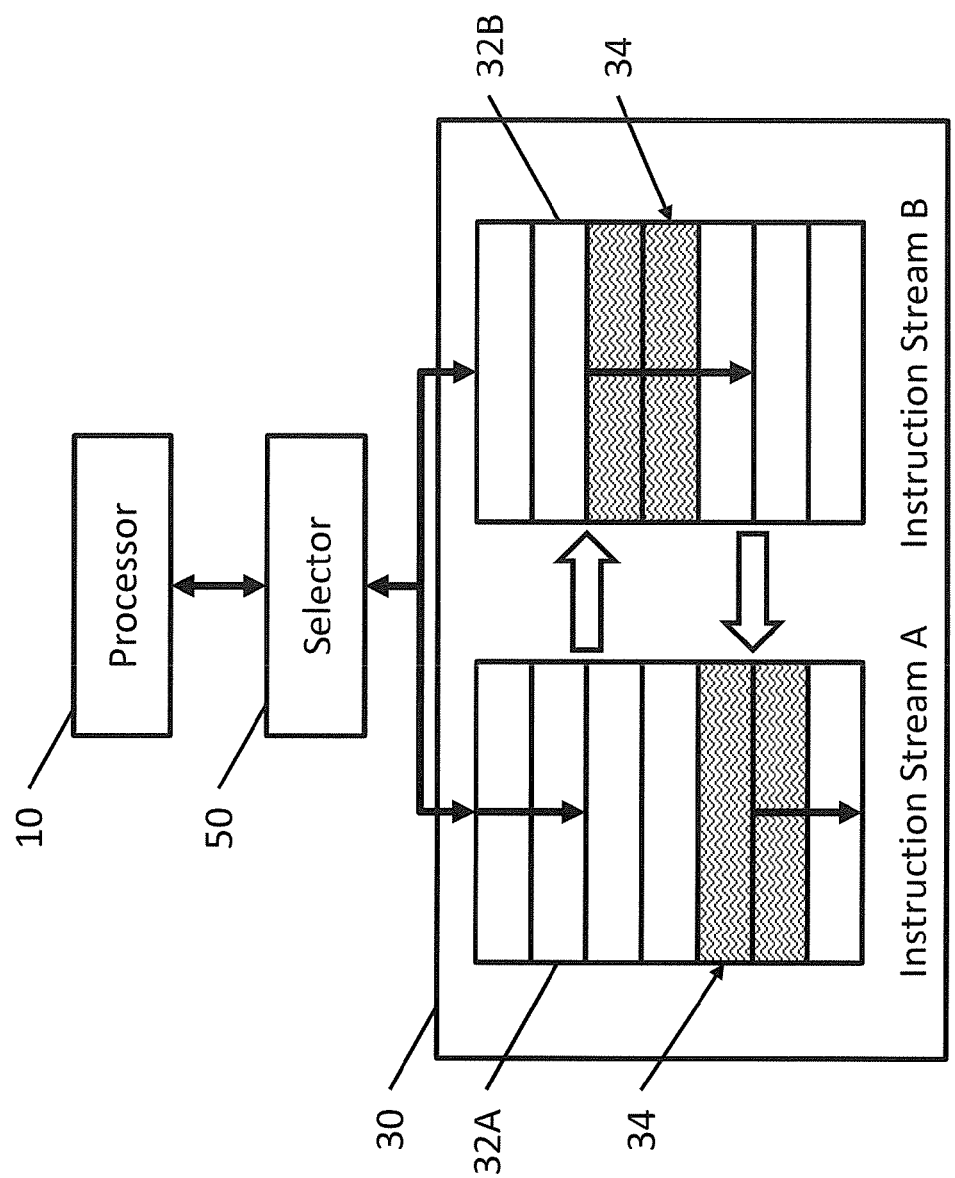

FIGS. 4A and 4B are schematic diagrams illustrating switching between instruction streams according to one embodiment of the present invention in the context of a code injection attack.

For example, referring to FIG. 4A, if the injected attack code 34 (shaded blocks 34 in FIG. 4A) was only placed into one of the instruction streams (here, Instruction Stream B 32B), then at least some portions of the attack code 34 would not be executed if the system switched between instruction streams. As another example, referring to FIG. 4B, if the attack code 34 (shaded blocks 34 in FIG. 4B) was split between two instruction streams, then it would be unlikely that the system would switch between instruction streams in a manner that resulted in all of the attack code being executed, thereby preventing the attack from succeeding.

Figure 5A:
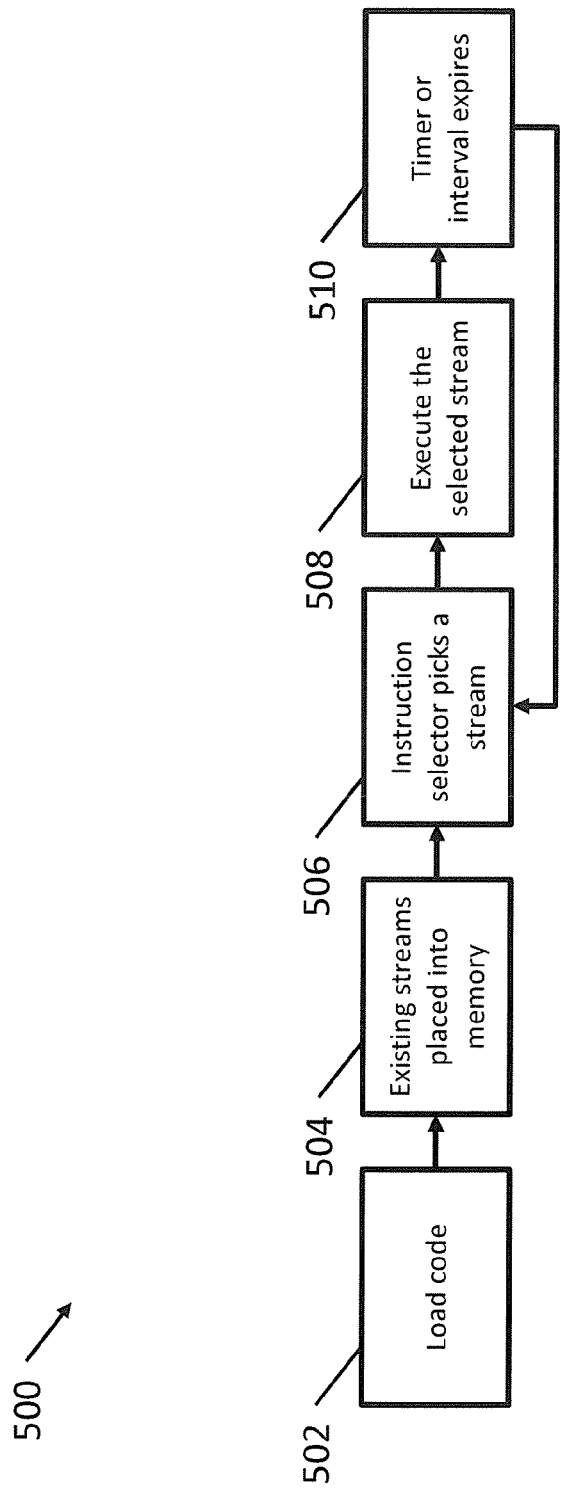
FIG. 5A is a process flow diagram illustrating a method of providing synthetic processing diversity in accordance with one embodiment of the present invention.

FIG. 5A is a process flow diagram illustrating a method 500 of providing synthetic processing diversity in accordance with one embodiment of the present invention. In operation 502, code is loaded from a binary (e.g., a binary stored on disk). In one embodiment, the binary includes a single instruction stream which is loaded into memory multiple times (e.g., at least two copies of the instruction stream are loaded into different places in memory) in operation 504 (e.g., by a modified version of an application loader such as the 'execve' function in Unix/Linux). In operation 506, the instruction selector 50 selects one of the instruction streams loaded into memory. In operation 508, one or more instructions of the selected instruction stream are executed. Upon expiration of a timer or interval (e.g., after executing some number of instructions, a block of instructions, or a given number of clock cycles) in operation 510, the process returns to operation 506 in which another of the instruction streams is selected.

According to one embodiment of the present invention, the multiple instruction streams loaded from the binary are generated and stored in the binary during compilation of the binary. The multiple equivalent streams can be encoded differently, as discussed in more detail below with respect to FIGS. 6 and 7. However, embodiments of the present invention are not limited thereto and can apply to any multiple equivalent streams that are functionally equivalent (e.g., two streams that have their instruction sets randomized in different ways using instruction set randomization or using an instruction set in which there are multiple equivalent opcodes for each possible operation executed by the processor such that two streams could have entirely different opcodes while still performing the same function on an instruction-by-instruction basis). In this embodiment, at least two of these streams loaded from the binary are loaded into memory in operation 504.

Figure 5B:
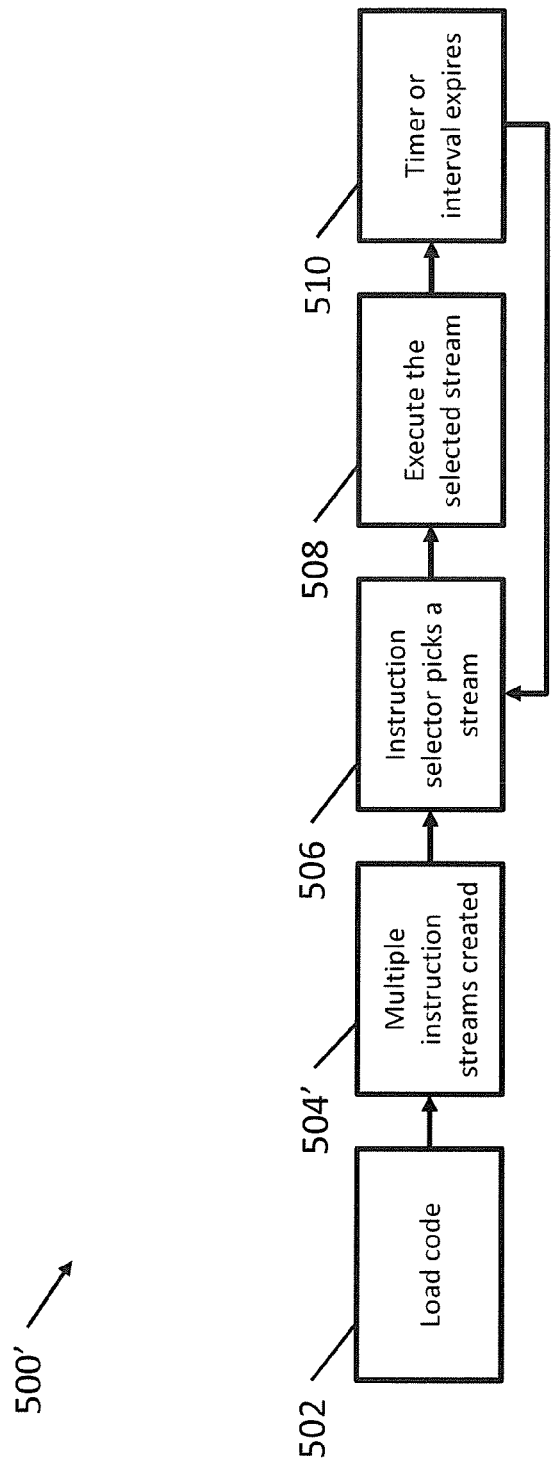
FIG. 5B is a process flow diagram illustrating a method of providing synthetic processing diversity in accordance with one embodiment of the present invention.

FIG. 5B is a process flow diagram illustrating a method 500' of providing synthetic processing diversity in accordance with one embodiment of the present invention. The method of 500' is substantially the same as method 500 as described above with respect to FIG. 5A and descriptions of substantially similar operations will not be repeated. In operation 504', multiple instruction streams are created after loading code from the binary in operation 502. In one embodiment, to create an additional instruction streams the application loader functionality is configured to allocate multiple sections of memory for instruction streams and multiple copies of the program code are loaded into those allocated sections of memory. The program code may be, for example, the "text" section of an Executable and Linkable Format (ELF) binary or the "text" section of a Portable Executable (PE) binary.

In some embodiments, the multiple streams loaded into memory are identical streams, and a system having a functional block diagram like that shown in the embodiment of FIG. 3 can be used to process the multiple identical streams.

In other embodiments, the various streams are encoded (e.g., each of the instruction streams loaded into memory can be encoded differently). Encoded streams are functionally equivalent after decoding but their values (their values in memory) are different before decoding.

Figure 6:
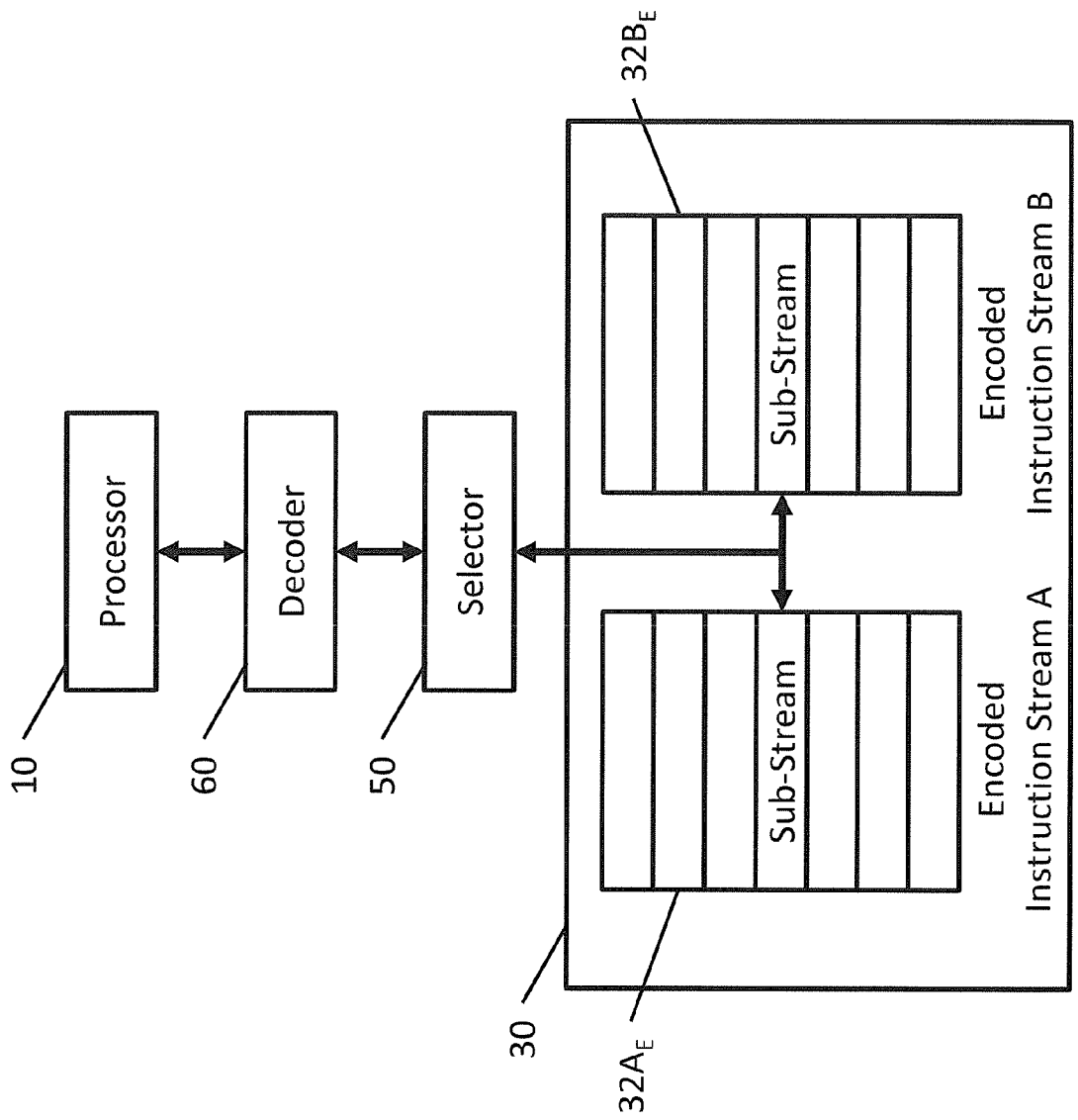
FIG. 6 is a schematic diagram illustrating a system configured to switch between encoded instruction streams according to one embodiment of the present invention.

FIG. 6 is a schematic diagram illustrating a system configured to switch between encoded instruction streams according to one embodiment of the present invention. Referring to FIG. 6, in one embodiment, the encoded instruction streams are stored in memory, each of the instruction streams being encoded differently (e.g., using a different encoding key or salt), thereby further increasing the diversity within the system by encoding each instruction stream using a different instruction set. A decoder 60 is placed between the selector 50 and the processor to decode the encoded instructions from the encoded instruction streams $32A_E$ and $32B_E$ before execution by the processor 10 by performing a decoding operation between the encoded data and its corresponding encoding key.

The encoding process can be any function that modifies an instruction and that is capable of restoring it to the original instruction during decoding. The encoder may be, for example, an XOR operation or a symmetric encryption operation such as Twofish, AES, RC4, or 3DES.

For example, instruction stream $I_0$ can be encoded by preforming the encoding operation (e.g., XOR or a symmetric encryption operation) between each instruction in $I_0$ and with a first encoding key $K_A$ to generate a first encoded instruction stream A $32A_E$ and by performing the encoding operation between each instruction in $I_0$ and a second encoding key $K_B$ to generate a second encoded instruction stream B $32B_E$. In one embodiment the encoding keys are generated using a hardware or software random number generator.

Figure 7:
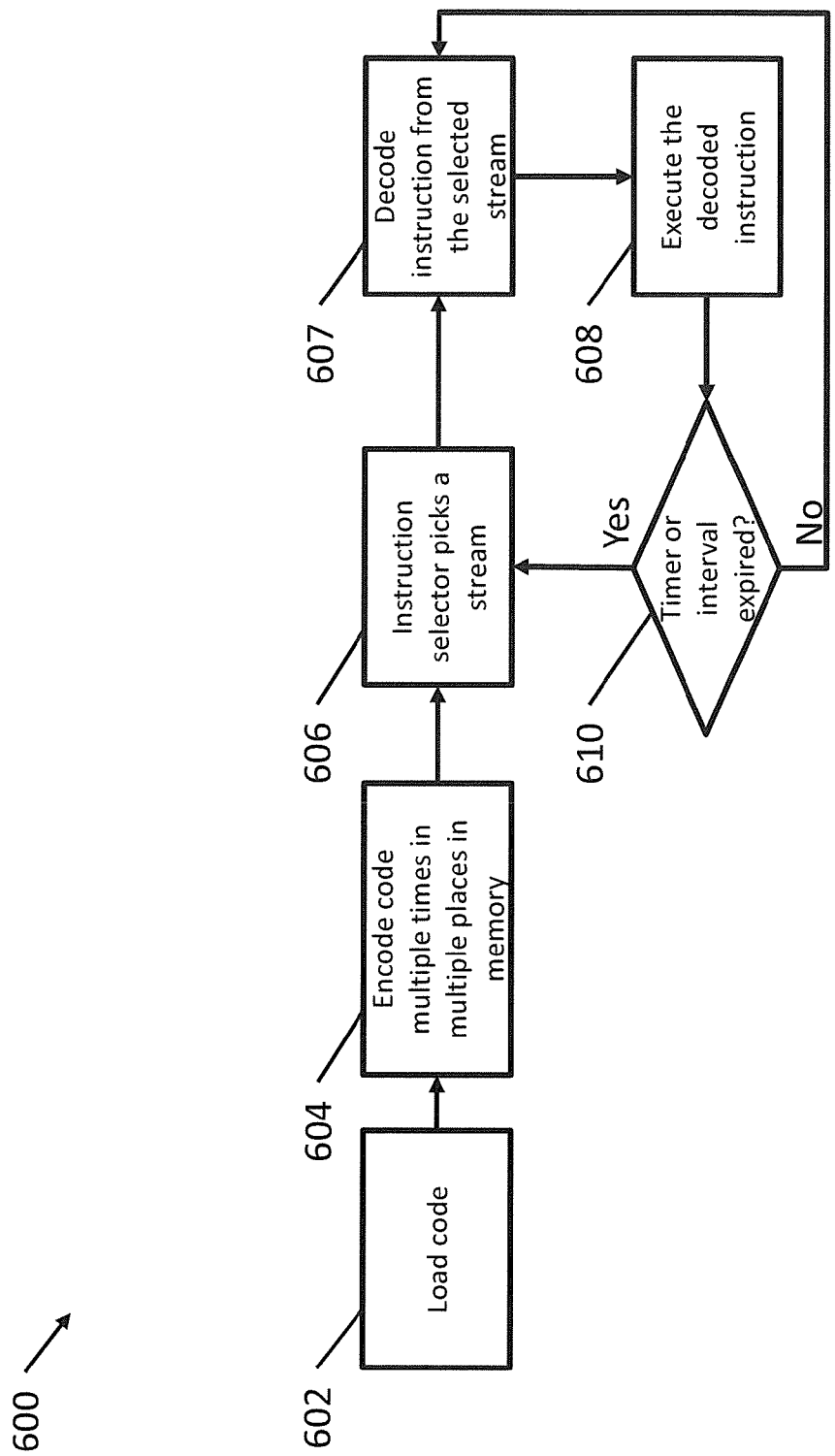
FIG. 7 is a process flow diagram illustrating a method of loading of providing synthetic processing diversity with encoded instruction streams according to one embodiment of the present invention.

FIG. 7 is a process flow diagram illustrating a method of loading of providing synthetic processing diversity with encoded instruction streams according to one embodiment of the present invention. In operation 602, code (or set of instructions) is loaded from a binary. In operation 604, multiple copies of the code are encoded (e.g., each with a different encoding key) and each encoded copy is placed in a different place in memory 30. As such, each encoded copy of the code is encoded using a different instruction set or architecture. In operation 606, the instruction selector 50 selects one of the encoded instruction streams. Encoded instructions from the selected instruction streams are decoded in operation 607, and the decoded instructions are executed in operation 608. This process of decoding instructions and executing the decoded instructions continues until a timer or interval expires in operation 610, at this point the instruction selector selects another encoded stream in operation 606.

According to one embodiment of the present invention, the selector 50 and/or the decoder 60 are implemented in software by emulating the computer architecture. For example, the selector 50 and decoder 60 may be implemented in a virtual machine platform (e.g., a hypervisor or other software emulating underlying hardware such as Bochs, Oracle® VirtualBox®, QEMU, or VMware®). In another embodiment of the present invention, the loading and selection of instruction streams may be implemented in a virtual machine application (e.g., a process level virtual machine such as a Java Virtual Machine, Low Level Virtual Machine, and Microsoft® Common Language Infrastructure).

The following C code illustrates a method of encoding and allocating multiple instruction streams into memory according to one embodiment of the present invention as implemented in software (e.g., in a hypervisor):

TABLE 1

```
// Number of instructions streams to produce
int ENCODE_ROUNDS;
// The encode values of each instruction stream
unsigned int ENCODE_VALUES[ ];
// Pointers to each encode text section
void* TEXT_SECTIONS[ ];
// This function will replace the emulators target mmap function, which is
//    responsible for placing a data or text section into memory
void* target_mmap(void* start_section, int sizeBytes, Type mmapType)
{
    // Address where the data/text was loaded
    void* loadAddress = NULL;
    // Buffer for performing the encoding
    unsigned char* encodeBuffer = NULL;
    // Only text sections are encoded and duplicated
    if(mmapType == EXECEUTABLE_CODE)
    {
        // Allocate memory for the encode buffer
        encodeBuffer = malloc(sizeBytes);
        // Create the multiple instruction streams
        for(int round = 0; round < ENCODE_ROUNDS; round++)
        {
            // Chose a random encoding value
            ENCODE_VALUES[round] = rand( );
            // Encode the text section
            encode(encodeBuffer, start_section, sizeBytes,
            ENCODE_VALUES[round]);
            // mmap the encoded text section
            loadAddress = original_target_mmap(encodeBuffer,
            sizeBytes, mmapType);
            // Add the text section to the set of possible streams
            TEXT_SECTIONS[round] = loadAddress;
        }
        free encodeBuffer;
    }
    else
    {
        // For data sections, call the orginal mmap
        loadAddress = original_target_mmap(start_section, sizeBytes,
        mmapType);
    }
    return loadAddress;
}
```

In the embodiment shown in Table 1, the above source code is added to existing virtual machine software and the target_mmap( ) function is used to intercept any calls that are made to mmap (a memory mapping function that is used to allocate memory for code and data). This target_mmap( ) function checks to see if instructions are being mapped, and if they are, creates multiple encoded copies of the instructions. The locations of these text sections and their corresponding encode values (or encode keys) are recorded in the TEXT_SECTIONS[ ] and ENCODE_VALUES[ ] arrays for use later when the instructions are decoded and executed. Any data mappings that occur are passed through to the original mmap function, original_target_mmap( ).

The following C code illustrates a method of selecting, decoding, and executing an instruction stream from the multiple instruction streams according to one embodiment of the present invention as implemented in software (e.g., in a hypervisor):

TABLE 2

```
// Number of instructions streams to produce
int ENCODE_ROUNDS;
// The encode values of each instruction stream
unsigned int ENCODE_VALUES[ ];
// Pointers to each encode text section
void* TEXT_SECTIONS[ ];
// Disassemble a single instruction
void disassemble_instruction(void* programCounter)
{
    unsigned int encodedinstruction = 0;
    unsigned int decodedInstruction = 0;
    // Select a random stream
    int streamNumner = rand(ENCODE_ROUNDS);
    // Get the current instruction in this stream. In this case the PC is
    //   relative to the start of the tet section
    encodedinstruction = TEXT_SECTIONS[streamNumner] +
    programCounter;
    // Decode the instruction
    decodedInstruction = decode_instruction(encodedinstruction,
                              ENCODE_VALUES[streamNumner]);
    // Translate the decoded instruction
    translate(decodedInstruction);
}
```

In the embodiment shown in Table 2, the listed code is added to the disassemble instruction function of existing virtual machine software. The encoded instruction is selected randomly from one of the available text sections, and then decoded with the associated encode value (or encode key). The decoded instruction is then translated and executed as it normally would.

Figure 8:
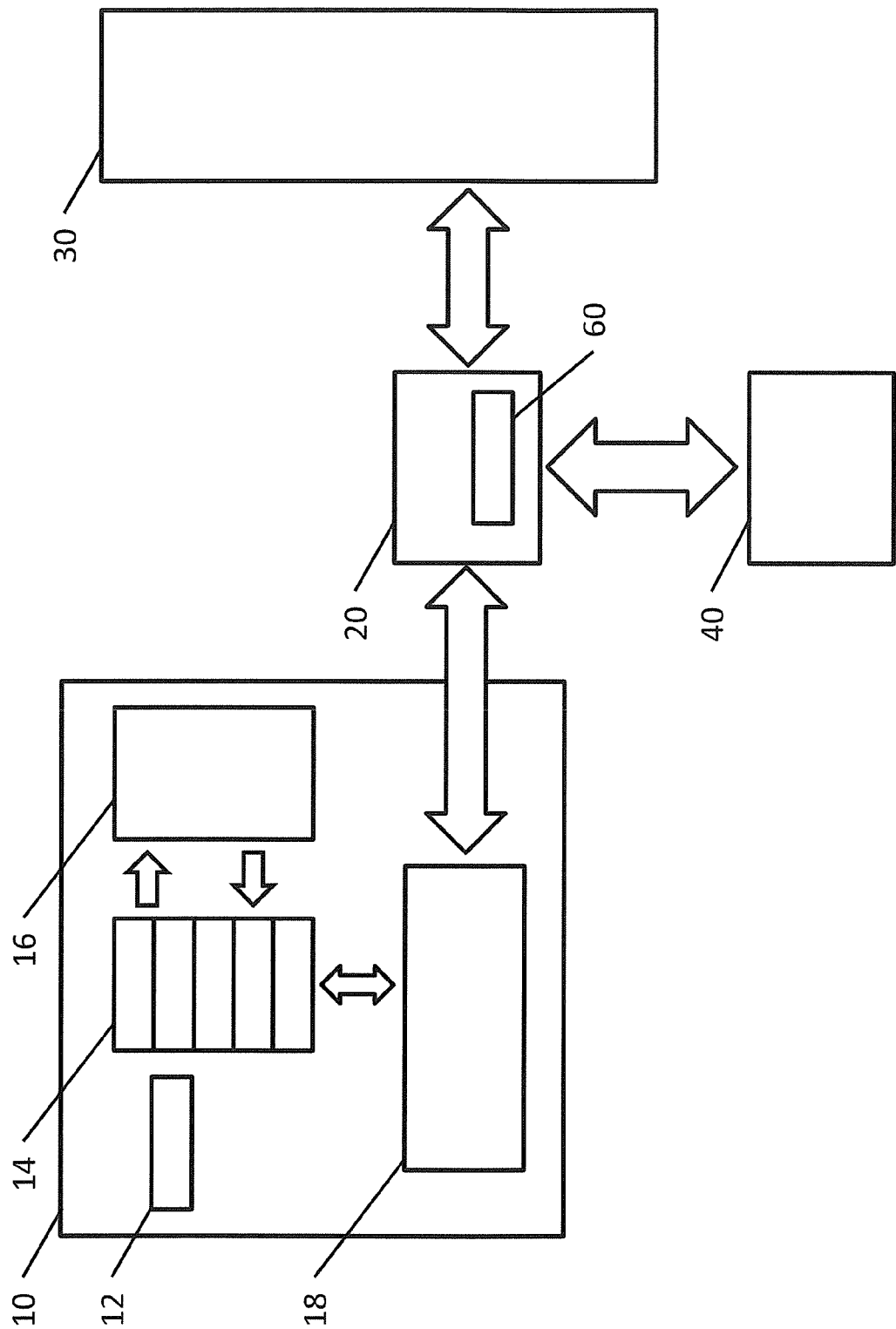
FIG. 8 is a schematic diagram of a computer system including a hardware instruction decoder in accordance with one embodiment of the present invention.
Figure 9:
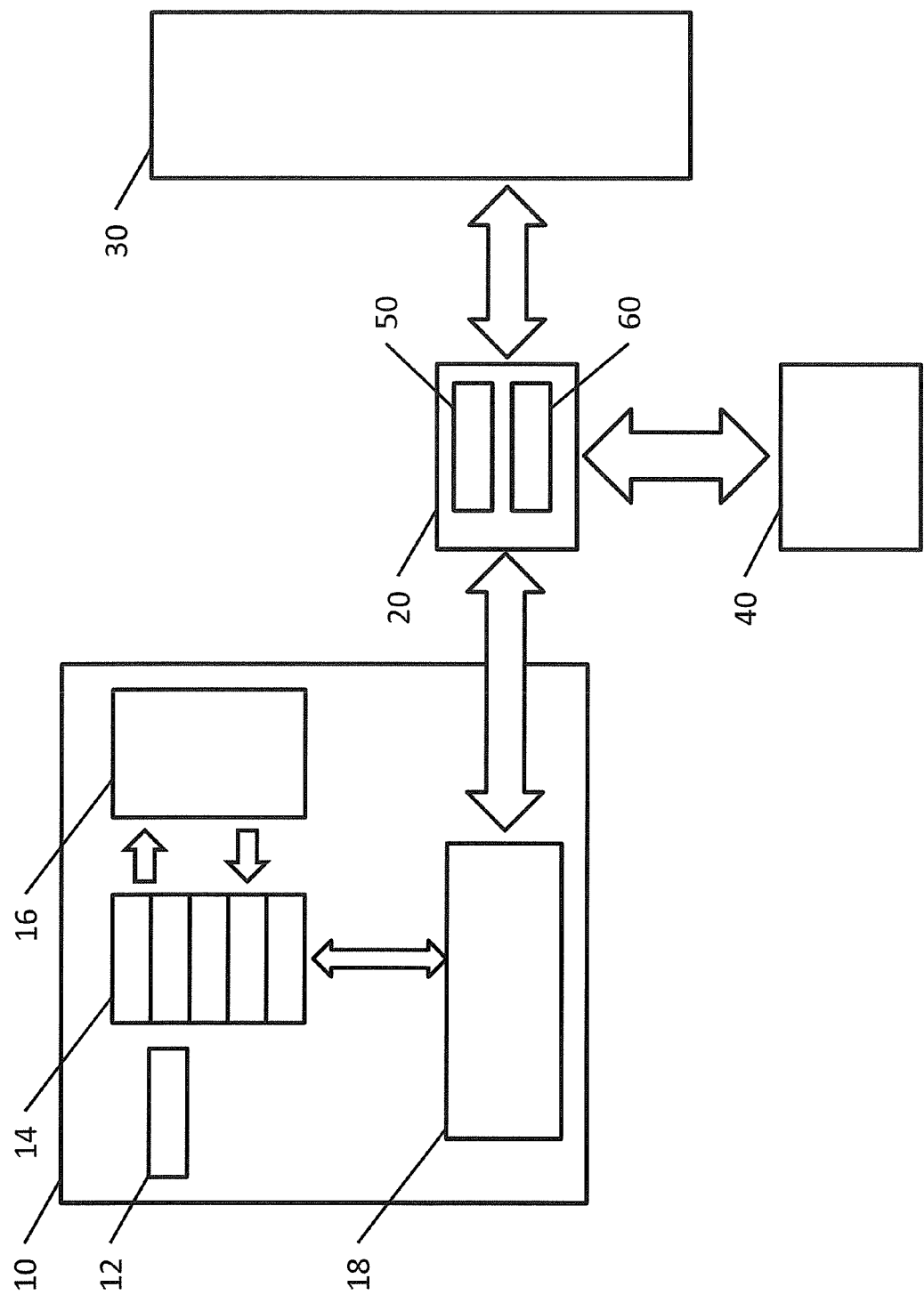
FIG. 9 is a schematic diagram of a computer system including a hardware instruction selector and a hardware instructor decoder in accordance with one embodiment of the present invention.

FIG. 8 is a schematic diagram of a computer system including a hardware instruction decoder 60 in accordance with one embodiment of the present invention. FIG. 9 is a schematic diagram of a computer system including a hardware instruction selector 50 and a hardware instructor decoder 60 in accordance with one embodiment of the present invention. In some embodiments, the selector 50 and/or the decoder 60 are implemented using application specific hardware located in the path between the processor and the memory 30, such as within the I/O bridge 20. However, embodiments of the present invention are not limited thereto and the selector 50 and/or the decoder 60 may be located anywhere along the path between the CPU and the memory 30.

Referring to FIG. 8, according to one embodiment of the present invention with a hardware based decoder 60, a modified application loader creates multiple copies of an application as it is loaded (as described above with respect to FIGS. 6 and 7). These copies are loaded into different locations in memory 30. Each of these locations has a "base" address that is recorded as the location of the corresponding instruction stream along with a possible decoding key. When the application runs, a kernel module performs the selection of an instruction stream (e.g., the kernel module acts as the selector 50). When a selection occurs, the module updates the memory management unit (MMU) to point to the location of the newly selected instruction stream and loads the corresponding decode value into the hardware decoder 60 so that the hardware decoder can decode the instructions retrieved from the newly selected stream.

Referring to FIG. 9, in other embodiments of the present invention, the selector 50 is also implemented in hardware, and would likely be located in the same place as the hardware decoder 60. The hardware instruction selector 50 stores the base addresses of the instruction streams that were loaded into memory and includes some logic to determine when to switch between instruction streams (e.g., a hardware timer or an instruction counter).

In one embodiment of the present invention an FPGA configured to implement the selector 50 is placed between the CPU 10 and memory 30. The FPGA includes registers to store the addresses of the different instruction streams 32 stored in memory 30. When a request to read an instruction is received from the CPU 10, the selector 50 translates the read instruction into a request to read instructions from the selected stream by modifying the memory address to be read in accordance with the address of the stream stored in the registers. The selector would then forward that read on to memory 30 to read the currently selected stream.

In embodiments in which encoded instruction streams are used, the FPGA further includes registers for storing the encoding keys corresponding to the instruction streams and a decoder 60 configured to decode, using the stored encoding keys, the instruction received from the memory 30 before the instruction is sent to the CPU 10.

In other embodiments, the registers, the selector 50, and the decoder 60 are integrated into a CPU or a memory controller and configured to function in a substantially similar way, wherein the selector 50 is configured to intercept accesses to memory to be sent over the bus by redirecting those requests to one of the instruction streams.

Although various components of the selector 50 and the decoder 60 are described herein as being implemented in software or hardware, one of skill in the art would understand that various components and functionality could be implemented in software, hardware, firmware, and combinations thereof.

In one embodiment of the present invention, the instruction selector 50 selects the instruction stream to be executed from among the plurality of equivalent instruction streams at random, thereby making it more difficult for an attacker to anticipate which stream will be used at any given time. The randomness of the selection of the stream will only be as good as the source of randomness available in the system, such as the Liunx/Unix "/dev/random" device or a Trusted Platform Module (TPM) device.

In other embodiments, the streams are selected in accordance with a pattern.

In embodiments of the present invention, a new stream can be selected by the selector 50 at a variable interval. Generally, increasing the frequency with which the stream is switched increases the security benefit by making it harder for an attacker to inject attack code into the stream that is executed. New stream selection can be based on a timer, or after a specific number of instructions have been executed.

In some embodiments, the computational effort for determining whether a timer has expired is greater than the computational effort of the actual switch between instruction streams. In such embodiments (e.g., software-based implementations of the instruction selector 50), the instruction selector 50 switches between streams after every instruction or based on counting a number of instructions.

In other embodiments (e.g., a hardware based instruction selector 50), a hardware based timer interrupt may make timer-based switching more computationally efficient than switching based on counting the number of instructions executed.

In some embodiments of the present invention, synthetic diversity can be further improved by combining the above-described technique of switching between multiple instruction streams with a technology such as Instruction Set Randomization (ISR), thereby simulating a heterogeneous processing system.

In principle, any number of streams can be loaded and selected from by the instruction selector 50 and would be limited only by the amount of memory available for storing multiple copies of the instruction streams.

Embodiments of the present invention incur some upfront performance impact (at load time), but little to no performance impact during operation. Embodiments of the present invention are also scalable and the number of instructions streams can be increased to increase security at the cost of increased memory usage.

The following discussion provides a mathematical and experimental analysis of the effectiveness of synthetic processing diversity using multiple instruction sets as described above.

Generally, the likelihood of success of an attack decreases as the number of architectures (or instruction sets) increases. In a system in which an architecture is randomly selected from a plurality of architectures at application startup or when the machine is booted and under conditions in which the attacker knows the set of all possible architectures that the system could select from, the average number of attempts until a successful breach is equal to the number of architectures. As such, the likelihood of a successful attack is the inversely proportional to the number of architectures. Mathematically, the inverse relationship corresponds to a geometric distribution because each of the attack attempts can be viewed as a Bernoulli trial.

Given that x is the attempt the attack will be successful and p is the probability of success of an attack (fixed for a given set of architectures):

$$x = \text{geometric}(p) \quad (1)$$

As x is geometric, the probability that the $k^{th}$ trial is successful is given as:

$$P(x=k) = (1-p)^{k-1} \times p \quad (2)$$

In addition, the expected value of a geometric distribution is given as:

$$E(x) = \frac{1}{p} \quad (3)$$

However, p is known (as discussed above, p=# of architectures$^{-1}$, so equation (3) reduces to:

$$E(x) = \frac{1}{\text{\# of architectures}^{-1}} = \text{\# of architectures} \quad (4)$$

Figure 10:
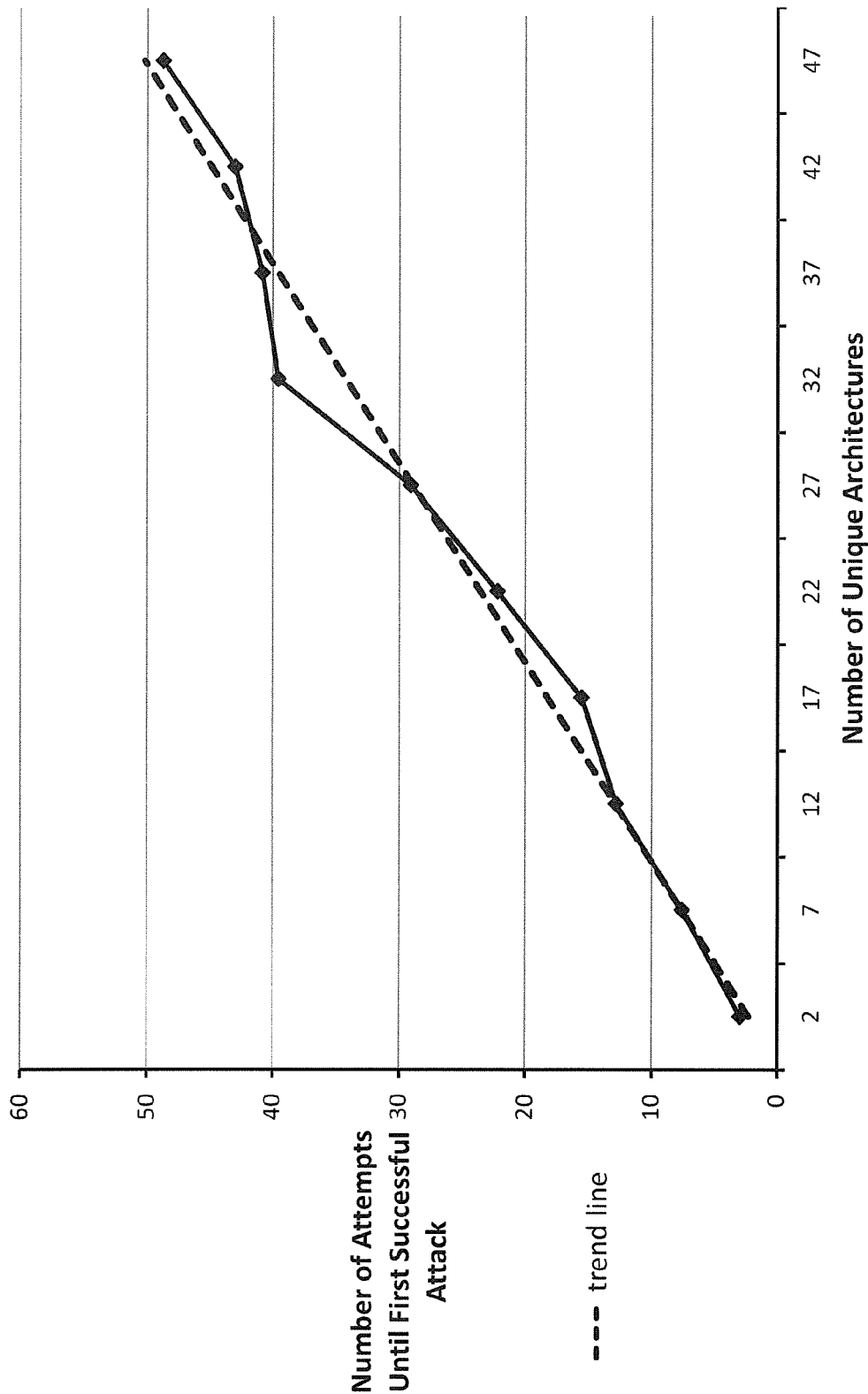
FIG. 10 is a graph of experimental data illustrating the number of attempts until a successful attack against the number of unique architectures in a computer system configured to randomly select one of the unique architectures.

To test this hypothesis, code injection attacks were performed against a virtual machine running within QEMU. In the experiments, the virtual machine was configured to select one of a plurality of unique architectures for each run. FIG. 10 plots these experimental results as the number of attempts until the first successful attack against the number of unique architectures in the virtual machine.

The graph shown in FIG. 10 agrees with what would be predicted by the results of the statistical analysis, as given in equations (2) and (5). However, these numbers assume that no action is taken by the system operator when these attacks fail. In embodiments of the present invention, when an attack fails, there is an invalid instruction alert can be displayed to the system operator (e.g., in an alert sent as a message popup on a display, as a notification on a mobile device, as an email alert, etc.). Given the severity of instruction-level errors it is likely that a system operator (or security monitoring software/hardware) would recognize the incoming attacks and respond.

As described above, the probability that an attacker will successfully guess the correct architecture (using a single architecture payload) is simply the inverse of the number of architectures. When multiple architectures are required for the payload in the context of architecture shifting, the probability of successful breach can be expressed as:

$$p = \frac{1}{a^{\gamma}} \quad (5)$$

Where $\alpha$ is the number of possible architectures, and r is the number of architectures required in the payload (or the number of shifts performed by the system during execution). The below statistical analysis again assumes the worst case scenario that the attacker knows the set of all possible architectures.

Figure 11:
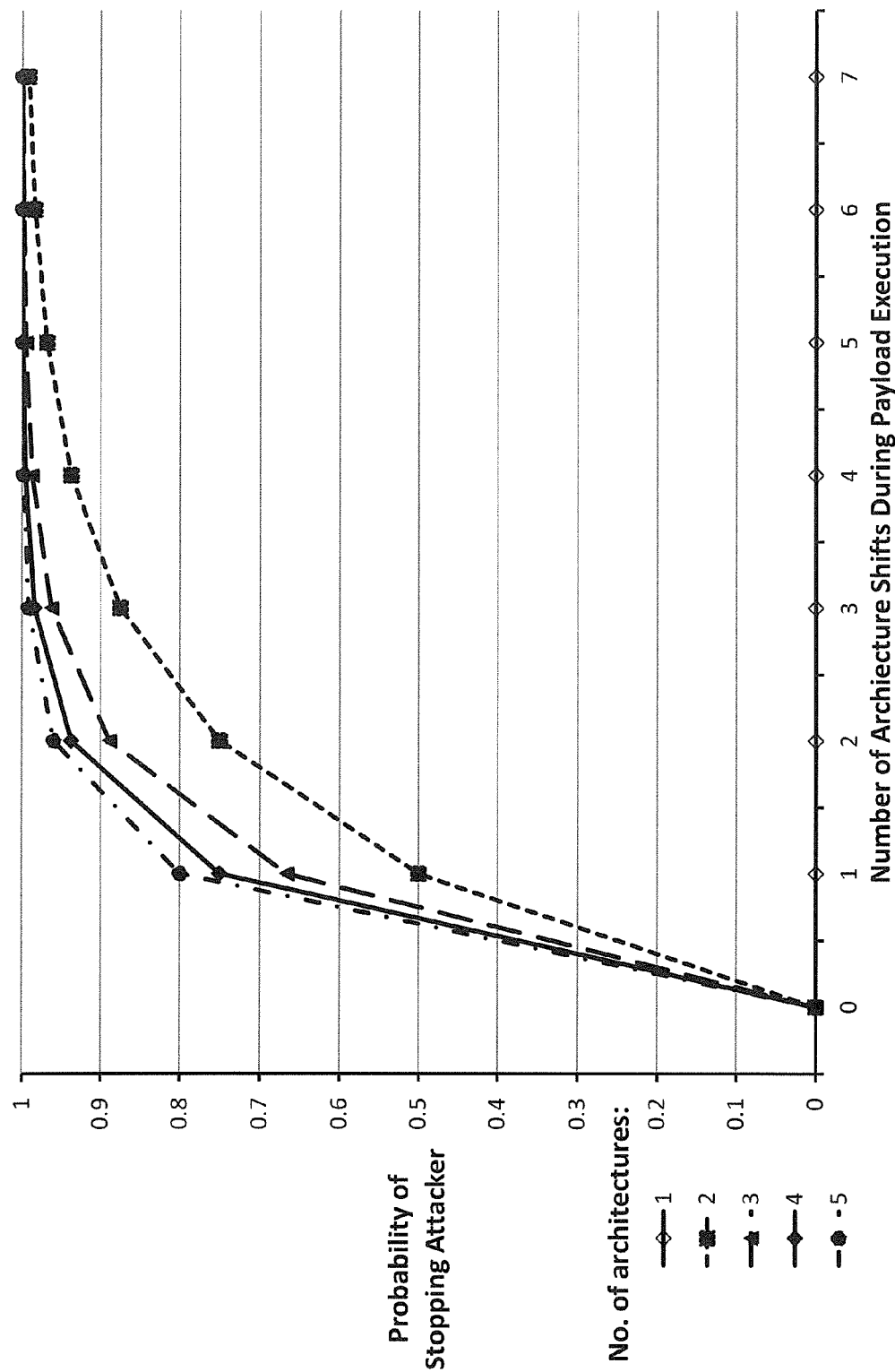
FIG. 11 is a graph comparing the probability of stopping an attacker in a prior art system operating in only a single architecture against the probability of stopping an attacker in systems according to embodiments of the present invention in which two to five architectures are selected from and shifted between during execution.

As shown in FIG. 11 the probability that an attacker will successfully execute the entire payload exponentially decreases as the number of architectures required in the payload increases. In the examples illustrated, only up to 5 architectures are selected from, but architectures can repeat (e.g., can be selected more than one), which allows the number of architecture shifts during execution to be higher than the number of available architectures.

Comparing the results of architectural shifting to the results from architecture randomization alone (without shifts), the security benefit provided by shrinking the attack space is clear. Even with only two architectures, after only five architecture shifts during execution the probability of stopping the attacker is over 95%. In addition, as seen in FIG. 11 and in equation (5), as the number of architectures increases, the probability of stopping an attack grows more quickly with respect to the number of architectural shifts during execution and quickly approaches 100%.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method of increasing processing diversity on a computer system, the method comprising:
   a) duplicating, in a context, a computer program execution instruction stream into a plurality of instruction streams, each of the plurality of instruction streams being equivalent;
   b) encoding each of the plurality of instruction streams using a different encoding key;
   c) decoding a first instruction stream of the plurality of instruction streams;
   d) executing said decoded first instruction stream of the plurality of instruction streams to execute a first portion of the computer program;
   e) stopping execution of the first decoded instruction stream at a first location of the first instruction stream;
   f) decoding a second instruction stream of the plurality of instruction streams starting at a second location of the second instruction stream, the second location corresponding to the first location of the first instruction stream; and g) executing said decoded second instruction stream of the plurality of instruction streams at said second location of the second instruction stream to execute a second portion of the computer program immediately following the first portion, wherein steps c to g are repeated until all of the plurality of instruction streams are decoded and executed, and wherein the first location of the first instruction stream and the second location of the second instruction stream are randomly selected.

2. The method of claim 1, wherein each of the plurality of instruction streams is loaded from a binary and is identical to the rest of the plurality of instruction streams.

3. The method of claim 1, wherein each of the plurality of instruction streams is generated from an instruction stream loaded from a binary and is identical to the rest of the plurality of instruction streams.

4. The method of claim 1, wherein the method of increasing processing diversity on the computer system is performed using a virtualization program executing on the computer system.

5. The method of claim 1, wherein the method of increasing processing diversity on the computer system is performed using a hardware instruction selector.

6. A non-transitory computer readable medium embodying program instructions for execution by a data processing apparatus, the program instructions adapting the processing apparatus for:
   a) duplicating, in a context, a computer program execution instruction stream into a plurality of instruction streams, each of the plurality of instruction streams being equivalent;
   b) encoding each of the plurality of instruction streams using a different encoding key;
   c) decoding a first instruction stream of the plurality of instruction streams;
   d) executing said decoded first instruction stream of the plurality of instruction streams to execute a first portion of the computer program;
   e) stopping execution of the first decoded instruction stream at a first location of the first instruction stream;
   f) decoding a second instruction stream of the plurality of instruction streams starting at a second location of the second instruction stream, the second location corresponding to the first location of the first instruction stream; and
   g) executing said decoded second instruction stream of the plurality of instruction streams at said second location of the second instruction stream to execute a second portion of the computer program immediately following the first portion, wherein steps c to g are repeated until all of the plurality of instruction streams are decoded and executed, and
   wherein the first location of the first instruction stream and the second location of the second instruction stream are randomly selected.

7. The non-transitory computer readable medium of claim 6, wherein each of the plurality of instruction streams is loaded from a binary and is identical to the rest of the plurality of instruction streams.

8. The non-transitory computer readable medium of claim 6, wherein each of the plurality of instruction streams is generated from an instruction stream loaded from a binary and is identical to the rest of the plurality of instruction streams.

9. The non-transitory computer readable medium of claim 6, wherein the non-transitory computer readable medium further embodies a virtualization program, and
   wherein the virtualization program comprises the program instructions.

10. A computer system comprising a processor and memory storing program instructions, the computer system being configured to:
   a) duplicating, in a context, a computer program execution instruction stream into a plurality of instruction streams, each of the plurality of instruction streams being equivalent;
   b) encode each of the plurality of instruction streams using a different encoding key;
   c) decode a first instruction stream of the plurality of instruction streams;
   d) execute said decoded first instruction stream of the plurality of instruction streams to execute a first portion of the computer program;
   e) stop execution of the first decoded instruction stream at a first location of the first instruction stream;
   f) decode a second instruction stream of the plurality of instruction streams starting at a second location of the second instruction stream, the second location corresponding to the first location of the first instruction stream; and
   g) execute said decoded second instruction stream of the plurality of instruction streams at said second location of the second instruction stream to execute a second portion of the computer program immediately following the first portion, wherein steps c to g are repeated until all of the plurality of instruction streams are decoded and executed, and
   wherein the first location of the first instruction stream and the second location of the second instruction stream are randomly selected.

11. The system of claim 10, wherein each of the plurality of instruction streams is loaded from a binary and is identical to the rest of the plurality of instruction streams.

12. The system of claim 10, wherein each of the plurality of instruction streams is generated from an instruction stream loaded from a binary and is identical to the rest of the plurality of instruction streams.

13. The system of claim 10, wherein a virtualization program executing on the computer system configures the computer system to: execute, in the context, the first stream of the plurality of instruction streams; stop execution of the first stream at the first location of the first stream; and execute, in the context, the second stream of the plurality of instruction streams.

14. The system of claim 10, further comprising a hardware instruction selector configured to execute, in the context, the first stream of the plurality of instruction streams; stop execution of the first stream at the first location of the first stream; and execute, in the context, the second stream of the plurality of instruction streams.

* * * * *